United States Patent [19]
Birley et al.

[11] Patent Number: 4,564,743
[45] Date of Patent: Jan. 14, 1986

[54] FUSION WELDING OF ALUMINUM ALLOYS

[75] Inventors: Stuart S. Birley; Philip E. Roper, both of Bracknell, England

[73] Assignee: The Secretary of State for Defence in Her Britannic Majesty's Government of the United Kingdom of Great Britain and Northern Ireland

[21] Appl. No.: 531,895
[22] PCT Filed: Jan. 7, 1983
[86] PCT No.: PCT/GB83/00001
§ 371 Date: Aug. 23, 1983
§ 102(e) Date: Aug. 23, 1983
[87] PCT Pub. No.: WO83/02415
PCT Pub. Date: Jul. 21, 1983

[30] Foreign Application Priority Data
Jan. 20, 1982 [GB] United Kingdom ............ 8201573

[51] Int. Cl.⁴ .................................. B23K 9/235
[52] U.S. Cl. .................. 219/137 R; 219/121 ED; 228/208
[58] Field of Search ......... 219/137 R, 76.14, 121 ED; 228/208

[56] References Cited
U.S. PATENT DOCUMENTS
4,269,867 5/1981 Altorfer et al. ............... 219/76.14

FOREIGN PATENT DOCUMENTS
962923 2/1975 Canada .
470323 8/1937 United Kingdom .
568918 4/1945 United Kingdom .
1587235 4/1981 United Kingdom .

*Primary Examiner*—Roy N. Envall, Jr.
*Assistant Examiner*—Alfred S. Keve
*Attorney, Agent, or Firm*—Pollock, Vande Sande and Priddy

[57] ABSTRACT

A method for fusion welding together two portions of a parent metal comprised by an aluminum alloy includes the steps of surface abrading the two portions in at least the region of their mutual interface and intended weld zones, applying to each abraded surface a hot-sprayed coating comprised by a metal having a lower electrochemical potential than the parent metal, abutting the two coated portions at the mutual interface, and fusing them together by fusion welding.

10 Claims, 3 Drawing Figures

FUSION WELDING OF ALUMINUM ALLOYS

TECHNICAL FIELD OF THE INVENTION

This invention relates to fusion welding of alloys and in particular but not exclusively to aluminum alloys containing zinc and magnesium.

BACKGROUND ART

Fusion welded joints formed from parent metals of aluminum alloys containing zinc and magnesium are susceptible to corrosion, particularly at regions of the weld where a magnesium-rich segregate has formed. Three types of corrosion can occur, namely exfoliation corrosion, weld toe corrosion and stress corrosion, all of which can seriously degrade the mechanical strength of the weld.

These corrosion types are herein defined with reference to the accompanying drawings.

The T-joint illustrated in FIG. 1 comprises an edge plate 1 and a face plate 2 welded together by two fillet welds 3 formed by a conventional metal-inert-gas (MIG) process. Each weld has a fusion zone 4, a heat affected zone 5, a weld zone 6 and a weld toe 7.

Exfoliation corrosion manifests itself as a groove 8 in the heat affected zone 5 parallel with the line of the weld.

Weld toe corrosion occurs at the weld toe 7, where segregate concentration can be high, and once initiated can lead to a crack 9 which extends into the plate 2 along the interface of the fusion zone 4 and the heat affected zone 5. This effect is sometimes known as 'white zone cracking' or 'boundary bead cracking'.

An effect of stress corrosion, sometimes known as "hidden edge cracking", is illustrated in FIG. 2. The face plate 2 of this L-joint is provided with a rebate 10 within which the edge plate 1 is located. Remanent moisture trapped within the rebate 10 can lead to corrosion at the interfaces of the plates 1 and 2 which manifests itself as a crack or cracks in the parent metal, extending from the interfaces in a plane parallel with the respective plate, eg cracks 11 and 12 in the plates 1 and 2 respectively.

It is known to minimize the effect of the second of these corrosion types, ie weld toe corrosion, by removing the segregate from the weld toes immediately after welding, either by mechanical means or with a laser beam.

Attempts have also been made to prevent deposition of the segregate at the weld toe during the welding process, for example, by the application of a repellant coating to the parent metal adjacent to the weld toe location prior to welding so as to cause the segregate to flow outwardly from the weld toe during the welding process. Subsequent weld toe cracking can be successfully eliminated in this way but the lateral displacement of the segregate thus caused can exacerbate the exfoliation corrosion problem.

It is also well known to provide the exterior surfaces of steel structures with protection against environmental corrosion by application of a coating of a galvanically protective metal, and the present invention seeks to employ the principle of galvanic protection in a manner which can combat all three of the aforesaid corrosion problems.

THE INVENTION

In accordance with the present invention, a method for fusion welding together two parent metal portions includes the prior step of applying to each portion a coating comprised by a metal having a lower electrochemical potential than the parent metal and disposed so as to coat at least the region of mutual interface and the intended weld zones.

In a preferred method for carrying out the invention the coating is sprayed onto the parent metal portions by a conventional flame or are spraying procedure after prior preparation of the surfaces by grit blasting.

After application of the coating, the parent metal portions may be welded together by a conventional metal-inert-gas or tungsten-inert-gas process using a filler metal or by an electron beam welding process in which a filler may or may not be used. The coating is destroyed in the fusion zone during the welding process but is preserved at the remaining faces, right up to the weld toe.

SPECIFIC EXAMPLE OF THE INVENTION

Figure 3:
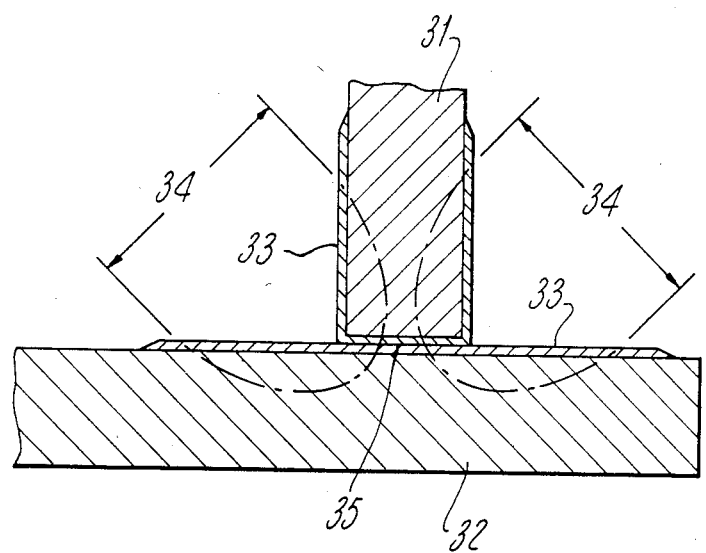
FIG. 3 is a transverse section through two abutted, galvanically coated portions of a T-joint similar to that of FIG. 1, prior to welding.

A specific application of a method in accordance with the invention will now be described by way of example only with reference to FIG. 3.

The portions illustrated comprise an edge plate 31 and a face plate 32 fabricated from a parent metal comprised by an aluminum alloy containing 4.5% by weight zinc and 2.5% by weight magnesium. The plates 31 and 32 are shown assembled ready for welding, having been previously provided, at surfaces extending throughout the intended weld zones 34 and a mutual interface 35, with a coating 33 of an aluminum alloy containing 4.5% by weight zinc, 0.8% by weight indium and substantially no magnesium. The coating 33 is applied by a conventional arc spraying process after first grit blasting the relevant surfaces with a coarse grit, preferably alumina of 60/80 mesh size, so as to provide sufficient key for satisfactory mechanical adhesion of the coating. Alternatively a conventional flame spraying process may be employed but, in general, arc spraying provides better adhesion and results in a coating having less porosity and lower oxide content, both of which latter advantages improve resistance to subsequent environmental degradation.

The thickness of the coating 33 should be sufficient to act as a thermal barrier in the intended weld toe region (see weld toe 7, FIG. 1) and to resist substantial constitutional supercooling at that location. It should also be thick enough to prevent premature corrosion in the intended heat affected zone (see zone 5, FIG. 1) but not so thick as to promote an unacceptably sharp profile at the weld toe. Thicknesses within the range 0.05 to 0.15 mm have been found suitable for meeting these requirements.

Figure 1:
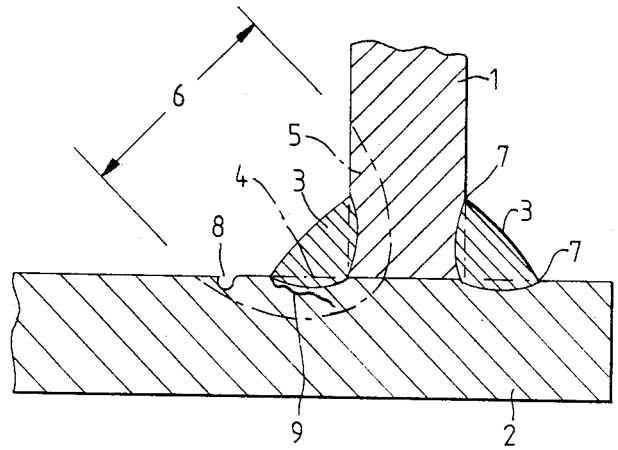
FIG. 1 is a transverse section through a fillet welded T-joint.
Figure 2:
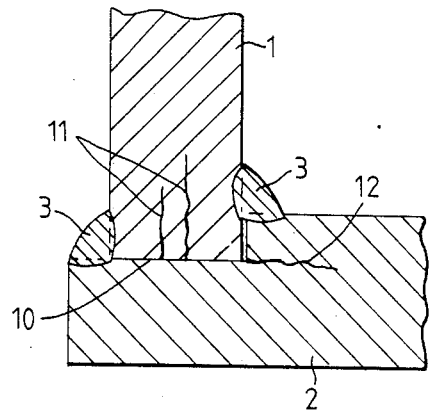
FIG. 2 is a transverse section through a fillet welded, rebated L-joint.

The assembled plates 31 and 32 are subsequently welded together in the manner indicated in FIG. 1 by a conventional tungsten-inert-gas welding process using an aluminum alloy filler containing about 5% magnesium.

The parent alloy used for the plates 31 and 32 of this specific example will have an electrochemical potential of about −940 mV in the heat affected zone 34 after completion of fusion.

It is of course important that the protective negative potential difference of the coating should be maintained throughout an acceptable working life. This depends directly upon the integrity of the coating, and the inclusion of the small quantity of indium used in the coating alloy of this example has been found to improve resistance of the coating to environmental degradation, and hence maintenance of the desired negative potential, without diminution of the mechanical strength of the weld. Other constituents can of course be used to impart similar corrosion resistance qualities to the coating, for example, tin has been found to be a suitable alternative to indium when used in similar proportion.

Welded joints manufactured in accordance with the present invention have the advantage that the onset of all three of the aforesaid types of corrosion is combated with a single preliminary treatment, which treatment can be readily applied to the parent portions individually before assembly and has no adverse effect upon the mechanical strength of the completed joint.

Additional ensurance against corrosion may also be provided by the application of a final external coating of the same galvanically protective metal that has been used for the pre-fusion stage of fabrication, which coating may be similarly applied by a conventional arc or flame spraying process.

We claim:

1. A method for fusion welding together two portions of a parent metal comprised by an alloy of aluminum, zinc and magnesium including the steps of surface abrading said portions in at least the region of their mutual interface and the intended weld zones, coating said portions by applying to each abraded surface a hot-sprayed coating comprised by a metal having a lower electrochemical potential than the parent metal, and abutting the two coated portions at the mutual interface and fusing them together by a fusion welding process, said fusion welding process being operative to destroy said coating in the fusion zone while leaving said coating intact at all the nonfused surfaces adjacent to the weld zones to provide a thermal barrier during the fusion welding process and subsequent galvanic protection against corrosion.

2. A method as claimed in claim 1 wherein the coating is applied by an arc spraying process.

3. A method as claimed in claim 1 wherein the coating is applied by a flame spraying process.

4. A method as claimed in claim 1 wherein the coating metal is an aluminum alloy containing zinc and substantially no magnesium.

5. A method as claimed in claim 4 wherein the coating metal additionally contains indium.

6. A method as claimed in claim 4 wherein the coating metal additionally contains tin.

7. A method as claimed in any one of claims 4 to 6 wherein the coating thickness is within the range 0.05 to 0.15 mm.

8. A welded joint produced by the method claimed in claim 1.

9. A method as claimed in claim 1 wherein the fusion welding process is a metal-inert-gas process.

10. A method as claimed in claim 1 wherein the fusion welding process is an electron beam welding process.

* * * * *